(12) United States Patent
Suwelack et al.

(10) Patent No.: US 11,954,923 B2
(45) Date of Patent: Apr. 9, 2024

(54) METHOD FOR RATING A STATE OF A THREE-DIMENSIONAL TEST OBJECT, AND CORRESPONDING RATING SYSTEM

(71) Applicant: Renumics GmbH, Karlsruhe (DE)

(72) Inventors: Stefan Suwelack, Ettlingen (DE); Markus Stoll, Karlsruhe (DE); Steffen Slavetinsky, Karlsruhe (DE)

(73) Assignee: Renumics GmbH, Karlsruhe (DE)

( * ) Notice: Subject to any disclaimer, the term of this patent is extended or adjusted under 35 U.S.C. 154(b) by 448 days.

(21) Appl. No.: 17/256,576

(22) PCT Filed: Jun. 28, 2019

(86) PCT No.: PCT/DE2019/200066
§ 371 (c)(1),
(2) Date: Dec. 28, 2020

(87) PCT Pub. No.: WO2020/001711
PCT Pub. Date: Jan. 2, 2020

(65) Prior Publication Data
US 2021/0124982 A1 Apr. 29, 2021

(30) Foreign Application Priority Data
Jun. 29, 2018 (DE) ...................... 10 2018 210 768.8

(51) Int. Cl.
*G06V 20/64* (2022.01)
*G06F 18/214* (2023.01)
(Continued)

(52) U.S. Cl.
CPC ............ *G06V 20/64* (2022.01); *G06F 18/214* (2023.01); *G06F 18/2413* (2023.01); *G06N 3/08* (2013.01); *G06V 10/764* (2022.01); *G06V 10/82* (2022.01)

(58) Field of Classification Search
None
See application file for complete search history.

(56) References Cited

FOREIGN PATENT DOCUMENTS

| EP | 2 169 567 A2 | 3/2010 |
|---|---|---|
| EP | 3 098 734 A1 | 11/2016 |

(Continued)

OTHER PUBLICATIONS

Bian, X. et al., "Multiscale Fully Convolutional Network with Application to Industrial Inspection," *In Applications of Computer Vision (WACV), IEEE Winter Conference*, pp. 1-8, 2016.

(Continued)

*Primary Examiner* — Leon Flores
(74) *Attorney, Agent, or Firm* — Seed IP Law Group LLP

(57) ABSTRACT

A method for rating a state of a three-dimensional test object by taking into consideration a prescribed assessment task and by using a rating system comprising a neural network, wherein a training data record comprising multiple state data points from one or more three-dimensional training objects is provided and/or used, wherein the training data record comprises a known state rating in regard to the prescribed assessment task for each of the state data points, wherein the neural network of the rating system is parameterized in a training process by using the training data record in order to adapt the rating system to the prescribed assessment task, and wherein a state rating for a prescribed state data point of the test object is calculated with the adapted rating system in an execution process. In addition, a corresponding rating system and a computer program product are disclosed.

16 Claims, 12 Drawing Sheets

(51) Int. Cl.
G06F 18/2413 (2023.01)
G06N 3/08 (2023.01)
G06V 10/764 (2022.01)
G06V 10/82 (2022.01)

(56) References Cited

FOREIGN PATENT DOCUMENTS

| | | | |
|---|---|---|---|
| EP | 3 098 735 A1 | 11/2016 | |
| WO | 2017/023790 A1 | 2/2017 | |
| WO | 2017/156243 A1 | 9/2017 | |
| WO | WO-2019103767 A1 * | 5/2019 | ............. G01D 21/02 |

OTHER PUBLICATIONS

Dou, T. et al., "3D Deep Feature Fusion in Contrast-Enhanced MR for Malignancy Characterization of Hepatocellular Carcinoma," IEEE 15$^{TH}$ International Symposium on Biomedical Imaging, Apr. 4-7, 2018, Washington DC., USA, 6 pgs.
Garcke, J. et al., Machine Learning Approaches for Data from Car Crashes and Numerical Car Crash Simulations, NAFEMS, Jun. 2017, 15 pgs.
Guo, Y. et al., "Deep learning for visual understanding: A review," Neurocomputing 187:27-48, 2016, 22 pgs.
Hoskins, J. C. et al., "Artificial Neural Network Models of Knowledge Representation in Chemical Engineering," Comput. Chem. Engng. 12(9/10):881-890, 1988, 10 pgs.
Kalogerakis, E. et al., "3D Shape Segmentation with Projective Convolutional Networks," IEEE Computer Society 1:6630-6639, 2017, 10 pgs. https://www.computer.org/csdl/proceedings-article/cvpr/2017/0457g630/12OmNBtCCEi.
Kratz, A. et al., "Tensor Visualization Driven Mechanical Component Design," IEEE Pacific Visualization Symposium, pp. 145-152, 2014, 8 pgs.
Martin, J. et al., "Automated eigenmode Classification for airfoils in the presence of fixation uncertainties," Engineering Applications of Artificial Intelligence 67:187-196, 2018, 10 pgs.
Masci, J. et al., "Geodesic Convolutional Neural Networks on Riemannian Manifolds," IEEE International Conference on Computer Vision Workshop, pp. 832-840, 2015, 10 pgs.
Min, S. et al., "Deep learning in bioinformatics," Briefings in Bioinformatics 18(5):851-869, 2017, 19 pgs.
Nie, D. et al., "3D Deep Learning for Multi-modal Imaging-Guided Survival Time Prediction of Brain Tumor patients," Med Image Comput Comput Assist Interv. 9901:212-220, 2016, 14 pgs.
Slavetinsky, S. et al., "Deep Learning for CAE Automation" Karlsruhe Institute of Technology, NAFEMS World Congress Jun. 11-14, 2017, Stockholm, Sweden, 22 pgs. https://www.nafems.org/publications/resource_center/nwc17_678/.
Su, H. et al., "Multi-view Convolutional Neural Networks for 3D Shape Recognition," IEEE International Conference on Computer Vision pp. 945-953, 2015, 9 pgs.
Tatarchenko, M. et al., "Octree Generating Networks: Efficient Convolutional Architectures for High-Resolution 3D Outputs," IEEE International Conference on Computer Vision pp. 2107-2115, 2017, 9 pgs.
Verhagen, W. et al., "A critical review of Knowledge-Based Engineering: An identification of research challenges," Advanced Engineering Informatics, 26(1):5-15, 2012, 11 pgs.
Wang, P. et al., "O-CNN: Octree-based Convolutional Neural Networks for 3D Shape Analysis," ACM Transactions on Graphics, 36(4): 72, Jul. 2017, 11 pgs.
Zou, L. et al., "3D Cnn Based Automatic Diagnosis of Attention Deficit Hyperactivity Disorder Using Functional and Structural MRI," IEEE Access 5:23626-23636, Aug. 2017, 12 pgs.
International Search Report for Application No. PCT/DE2019/200066, dated Oct. 4, 2019, 4 pgs.
LeCun, Y. et al., "Deep learning", Nautre, vol. 521, May 28, 2015, 10 pgs.
International Preliminary Report on Patentability for Application No. PCT/DE2019/200066, dated Jan. 7, 2021, 16 pgs.

* cited by examiner

METHOD FOR RATING A STATE OF A THREE-DIMENSIONAL TEST OBJECT, AND CORRESPONDING RATING SYSTEM

BACKGROUND

Technical Field

The disclosure relates to a method for rating a state of a three-dimensional test object.

The disclosure furthermore relates to a rating system for rating a state of a three-dimensional test object.

Lastly, the disclosure relates to a corresponding computer program product.

Description of the Related Art

In practice, it is known that in many areas of a product life cycle, such as development or maintenance, the precise assessment of the physical state of a mechanical or technical system is an important criterion for engineering decisions. These decisions include, for example, the design of safety margins or maintenance intervals. In this case, measurements or simulations generate a digital image of the mechanical or technical system (digital twin) on which the system state is given as a discretized scalar or vector field, e.g., in the form of a temperature, pressure, or stress distribution.

In practice, physical states of a mechanical system are assessed mostly manually by corresponding experts. The assessment is carried out on the basis of the personal experience of the expert. In the assessment, a tensor field is typically represented by suitable computer-based visualization programs. Reference is made in this respect to the non-patent literature "Kratz, A., Schoeneich, M, Zobel, V., Burgeth, B., Scheuermann, G., Hotz, I. and Stommel, M (2014, March): *Tensor visualization driven mechanical component design. In Visualization Symposium (PacificVis)*, 2014 *IEEE Pacific* (pp. 145-152). *IEEE.*" In addition to the tensor field, additional information, such as time stamps or simple numerical data, e.g., frequencies, are often also used for the assessment. In manual assessment, it is however particularly disadvantageous that they are very time-consuming and strongly dependent on the personal and subjective experience of the expert. Manual assessment is also susceptible to careless human mistakes and difficult to reproduce. FIG. 1 illustrates a manual assessment by an expert, which in practice is deemed to be a typical procedure in the assessment of mechanical systems.

In order to address the described disadvantages of manual assessment, it is desirable to automate the assessment process. For this purpose, it is necessary to map application-specific human expert knowledge in the computer. Research in this respect in the field of knowledge-based engineering (KBE) has been conducted since the 1990s. Reference is made in this regard, for example, to the non-patent literature "Verhagen, W. J., Bermell-Garcia, P., van Dijk, R. E. and Curran, R. *A critical review of Knowledge-Based Engineering: An identification of research challenges. Advanced Engineering Informatics* 26 (2012), 5-15." The basic idea is to describe the corresponding decision paths by means of rules and ontologies. In order to be able to apply these methods to sub-symbolic data, such as tensor fields, application-specific features, such as statistical variables, must first be extracted within regions or component parts. FIG. 2 illustrates an automatic assessment of the system state of a mechanical system, wherein rule-based automation becomes possible in some cases by defining application-specific features.

Although such rule-based automation solutions can be very valuable in individual cases, they also have considerable disadvantages: The formulation of application-specific rules and features is extremely time-consuming and the knowledge mapped in this way can usually be transferred only poorly or not at all to other applications. Furthermore, the accuracy lags considerably behind the assessment capability of human experts.

In comparison to rule-based KBE, methods are also known from practice which perform an automatic assessment of the system state on the basis of feature definition and machine learning methods. In this case, it is however problematic that when applied to system states which are given as tensor fields, application-specific features still have to be extracted first for dimensional reduction. FIG. 3 illustrates an automatic assessment of the system state of a mechanical system based on simple machine learning methods, wherein the machine learning methods require the definition of application-specific features for assessing system states. In order to extract the application-specific features, methods in practice use complex methods, such as spectral analyses, diffusion maps, or stochastic methods. In this respect, reference is made, for example, to the non-patent literature "Garcke, J., Iza-Teran, R., (2017): *Machine Learning Approaches for Data from Car Crashes and Numerical Car Crash Simulations, NAFEMS* 2017" and "Martin, I., & Bestle, D. (2018): *Automated eigenmode classification for airfoils in the presence of fixation uncertainties. Engineering Applications of Artificial Intelligence,* 67, 187-196." Significant disadvantages of these approaches, however, are the high outlay for identifying suitable application-specific features (feature engineering) and the considerably lower accuracy in comparison to the human expert.

The interpretation and classification of the respective system state of a mechanical or technical system is thus currently generally the responsibility of human experts who make a decision based on a visualization of the system state on the basis of their experience. This procedure is subjective and error-prone. Previous approaches known from practice for automating such classifications are based on rule-based approaches. In this case, predefined features are extracted (e.g., maximum value, mean value, histograms), which are then classified with a simple method (e.g., threshold value method). However, these approaches are highly problem-specific, difficult to maintain, and do not achieve the accuracy of human experts.

BRIEF SUMMARY

The present disclosure provides a method for rating a state of a three-dimensional test object of the type mentioned at the outset in such a way that an improved state rating, in particular with respect to efficiency and/or accuracy, is made possible. Furthermore, a corresponding rating system and a corresponding computer program product are specified.

According to the present disclosure, a method for rating a state of a three-dimensional test object takes into consideration a prescribed assessment task and uses a rating system comprising a neural network, wherein a training data record comprising multiple state data points from one or more three-dimensional training objects is provided and/or used. The training data record comprises a known state rating in regard to the prescribed assessment task for each of the state data points. The neural network of the rating system is parameterized in a training process by using the training data record in order to adapt the rating system to the prescribed assessment task. A state rating for a prescribed state data point of the test object is calculated with the adapted rating system in an execution process.

Also described herein is a rating system for rating a state of a three-dimensional test object that takes into consideration a prescribed assessment task, wherein the rating system comprises a, preferably deep, neural network, and is designed in such a way that a training data record comprising multiple state data points from one or more three-dimensional training objects can be used. The training data record comprises a known state rating in regard to the prescribed assessment task for each of the state data points. The rating system is furthermore designed in such a way that the neural network can be parameterized in a training process by using the training data record in order to adapt the rating system to the prescribed assessment task and, after adaptation to the prescribed assessment task, a state rating for a prescribed state data point of the test object can be calculated in an execution process.

Lastly, disclosed is a computer program product with program code that causes a processing system to provide and/or execute a method for rating a state of a three-dimensional test object as described herein.

It is of considerable advantage if within the framework of an automatic assessment of states of a test object, a definition or identification of application-specific features and rules, which usually takes place in advance, can be mostly avoided. According to the present disclosure, it was realized that using a neural network, in particular using a deep neural network, can bring about automation that allows a state of the test object to be assessed or rated fully automatically after performing a training process. Once the neural network has been adapted to or trained for a specific prescribed assessment task, the neural network can recognize and rate the state of prescribed input data, namely the state data point of the test object, on the basis of states previously learned in the training process based on the training data record. For this purpose, the state rating for the state data point of the test object is calculated by a correspondingly trained neural network.

The present disclosure therefore proposes a method in which a state of the three-dimensional test object is rated by taking into consideration a prescribed assessment task and by using a rating system comprising a neural network. According to the disclosure, a training data record comprising multiple state data points from one or more three-dimensional training objects is first provided and/or used. The training data record comprises a known state rating in regard to the prescribed assessment task for each of the state data points. In order to adapt the rating system to the prescribed assessment task, the neural network of the rating system is then parameterized in a training process by using the training data record. With the neural network adapted to the prescribed assessment task, the adapted or trained rating system can then calculate a state rating for a prescribed state data point of the test object in an execution process.

Consequently, an improved state rating, in particular with respect to efficiency and/or accuracy, is made possible with the method according to the disclosure.

In contrast to approaches from the prior art, which are highly problem-specific, difficult to maintain, and do not achieve the accuracy of human experts, the present disclosure and/or advantageous embodiments of the disclosure enable fully data-driven training of a rating system so that the rating system can rate or assess the state of a three-dimensional test object. The basis for this is a training data record which provides a problem-specific set of states with a known state rating. With this information, the rating system can then be trained for the prescribed assessment task, wherein a generic assessment algorithm of the rating system, preferably based on a deep neural network, is trained with the training data of the training data record. In contrast to conventional approaches known from the prior art, no a priori selected features are required for this purpose.

It should be pointed out here that the terms "three-dimensional test object" and "three-dimensional training object" can be understood, particularly within the scope of the claims and preferably within the scope of the description, in the broadest sense as three-dimensional, preferably concrete, objects which assume diverse states depending on the design of the object and/or based on inherent properties of the object. Within the scope of the present disclosure and/or within the framework of advantageous embodiments of the disclosure, the test object or the training objects can be provided, simulated, and/or used in the form of a digital twin or in the form of a digital virtual model. The digital twin can be generated by measurements and/or by simulations, namely by generating a digital image of the three-dimensional object, wherein the state is given as a discretized tensor field on the digital image. Furthermore, the three-dimensional test object or the three-dimensional training objects can be designed as digital virtual CAD models, on which the state is given as a discretized tensor field.

It should moreover be noted that the term "assessment task" is to be understood in the broadest sense, in particular within the scope of the claims and preferably within the scope of the description, namely as possible assessments and/or estimations of states which can be carried out in regard to a three-dimensional test object or in regard to a three-dimensional training object.

Regarding the term "state rating," it should be pointed out, in particular within the scope of the claims and preferably within the scope of the description, that a state rating can be understood to mean the result of the assessment task for a prescribed state data point.

In regard to the term "discretization," it should be noted that by taking into consideration a macroscopic view, continuous measurement distributions can be present in physical reality. Since only a finite number of values can be stored in the computer/processor when creating a digital twin or a digital virtual model, a discrete subset of the potentially infinite number of measurements can therefore advantageously be formed (discretization).

With respect to a "deep neural network," it should be pointed out, in particular within the scope of the claims and preferably within the scope of the description, that a deep neural network is distinguished from a conventional or simple neural network by a larger number of layers. Advantageously, a deep neural network can comprise at least six layers.

In order to be able to suitably train a deep neural network, special mathematical formulations or calculation rules may be required. A convolutional network, i.e., a convolutional neural network, can therefore advantageously be provided as a deep neural network. Regarding further details on convolutional neural networks or on the functional principle of deep neural networks, reference is made to the non-patent literature "LeCun, Y., Bengio, Y., & Hinton, G. (2015): *Deep learning. Nature,* 521(7553), 436."

The rating system can advantageously be implemented as a software system according to program code operating on a powerful computer. The computer could also advantageously have high-parallel computing units in the form of powerful graphics units. The rating system can be modular. A data module can enable the management and/or use of the training data. The neural network could be parameterized by means of a training module, and the parameterized neural network could finally be used for automatic rating by means of a rating module. Various interface modules can furthermore allow easy access to the rating system, for example by means of web-based protocols.

Advantageously, the three-dimensional test object can comprise a component part, a mechanical system, an electromechanical system, and/or an electrochemical system. A constructed technical system, which can consist of multiple component parts and components, can be regarded as a system here. For example, machines, installations, motor vehicles, etc., and/or parts thereof. States of a wide variety of technical systems can thus be rated efficiently.

In a further advantageous manner, the training objects of the training data record can be selected in a problem-specific manner in such a way that the prescribed assessment task can be applied to the training objects and to the test object. The training objects and the test object are thus in relation to one another in such a way that the prescribed assessment task is defined both for the training objects and for the test object. Consequently, with the correspondingly selected training data record or with the state data points and the associated known state ratings, the neural network of the rating system can be effectively trained for the assessment task. A trained/adapted neural network enables a state rating to be calculated by the rating system on the basis of a prescribed state data point of the test object.

In an advantageous embodiment, the state data points of the training objects and the state data point of the test object can each comprise spatial state data. The spatial state data can advantageously be data which describe and define the state of the test object or of the training object. That is to say, the spatial state data represent the state of the three-dimensional object to be rated. In this case, the spatial state data can be represented in the form of a spatial state field, wherein the state data are distributed in the three-dimensional space according to a predefined pattern or according to a predefined arrangement. Accordingly, the spatial state data with sampling points can span a three-dimensional sampling space, optionally around the test object or around the training object, wherein the sampling points are distributed in the sampling space according to a predefined arrangement in regard to the three-dimensional object (i.e., test object and/or training object). The spatial state data indicate the sampling values prevailing at the sampling points, e.g., physical measurements and/or sampling values calculated on the basis of simulation values, in regard to the three-dimensional object. An efficient processing of the spatial state data by the neural network of the rating system can thus be implemented, and completely data-driven training of the rating system can be realized.

Advantageously, the spatial state data comprised by a state data point of a training object can define a state of the training object. Furthermore, the spatial state data comprised by the state data point of the test object can define a state of the test object. With present or provided spatial state data, a state of the three-dimensional object (i.e., test object and/or training object) can thus be defined, which state is to be rated or determined by taking into consideration the prescribed assessment task. In order to provide the training data record, the "known" state rating belonging to the spatial state data of a state data point can be determined manually by a skilled expert. Furthermore, the known state rating to be determined in advance can also take place by analyzing historical data. A training data record can thus be provided with which the neural network of the rating system can be trained efficiently.

In an advantageous embodiment, the spatial state data of a state data point can be represented as a discretized scalar field, vector field, and/or tensor field. In this case, a tensor can represent a sampling value, such as a measurement and/or a sampling value calculated on the basis of simulation values, at a sampling point. The tensor field can then comprise a prescribable number of spatially distributed sampling values represented as a tensor with regard to the respective sampling points. In this case, a tensor can be regarded as the generalization of scalar values (zero-stage tensor), vectors (first-stage tensor), or matrices (second-stage tensor). A particularly advantageous representation of the spatial state data can thus be realized, which enables efficient processing of the spatial state data by the neural network of the rating system.

In an advantageous embodiment, the spatial state data of a state data point can be converted into the form of a regular grid. The grid can advantageously be a numerical grid, in particular a Cartesian grid. Efficient processing of spatial state data by the neural network of the rating system can thus be realized.

In an advantageous embodiment, the spatial state data of a state data point can be represented as a tensor of stage N+3, where N is the order of the state data per grid point. With this representation form, the spatial state data in the form of a regular Cartesian grid can be analyzed particularly efficiently by means of a neural network, preferably a deep neural network. In other words, N is here the order of the discretized tensor field of the input data for the neural network of the rating system. To a scalar field, such as a temperature field, N=1 then applies, for example. N=2 applies to a stress field. If the state data are additionally temporally resolved, the dimension additionally increases by 1. In a particularly advantageous manner, the spatial state data, e.g., measurement data and/or simulation data, of a state data point are converted into this representation so that efficient processing by the neural network of the rating system is made possible.

In an advantageous embodiment, the spatial state data of a state data point can map a physical variable. The spatial state data of the state data point can thus define a physical state of the test object or of a training object. The spatial state data of a state data point of the test object can then be analyzed by the rating system so that the state rating is calculated/determined on the basis of the underlying spatial state data for the state data point.

In an advantageous embodiment, the spatial state data of a state data point can comprise a temperature field, a deformation field, a velocity field, a stress field, a pressure field, a displacement field, and/or an electromagnetic field. In this case, the respective state field is advantageously present in discretized form. A wide variety of properties or corresponding states of a three-dimensional test object to be examined can thus be efficiently rated by means of the spatial state data of a state data point and by taking into consideration the prescribed assessment task.

In an advantageous embodiment, the spatial state data of a state data point can map a digitization state of the respective three-dimensional object. Preferably, the spatial state data of a state data point can comprise the local resolution of a numerical grid and/or a quality feature of a numerical grid. For example, the equilaterality of triangles could be taken into consideration as a quality feature of the numerical grid. A digitization state of a digitized three-dimensional test object can thus be efficiently rated.

The state data points of the training objects and the state data point of the test object can advantageously comprise at least one supplementary parameter in addition to the spatial state data. Further parameters, which, possibly, influence the state of the three-dimensional object, can thus be taken into consideration in the determination or calculation of the state rating for a state data point. This provides more accurate results.

In an advantageous embodiment, the training process can comprise a parameter optimization step, wherein a state rating for each state data point of the training data record is calculated by the rating system in the parameter optimization step. In the process, the known state rating of the training data record belonging to the respective state data point can be compared to the calculated state rating so that network parameters of the neural network are adapted as a function of the comparison. The network parameters are the weightings of the neural network of the rating system required for the calculations of the neural network. By means of the change or adaptation of the network parameters or the weightings of the neural network, the generic assessment algorithm of the rating system can be adapted to and trained for the prescribed assessment task. An efficient calculation of the state rating for a state data point of the test object can thus be made possible.

The parameter optimization step can advantageously be performed multiple times, optionally with different training data records. A more precise rating of a state of a test object can thus be realized.

In an advantageous embodiment, application-specific network parameters of the neural network of the rating system can be determined by backpropagation in the training process, wherein the training data record and initial network parameters (i.e., initial weightings) of the neural network are used as input data for the backpropagation. Here, initial network parameters/weightings can be understood as network parameters that are provided with initial values before a first training process. An efficient calculation of the state rating for a state data point of the test object can thus be made possible.

The neural network of the rating system can advantageously be configured in such a way that the spatial state data and the at least one supplementary parameter are processed separately from one another in multiple convolutional layers before the respectively calculated intermediate results are recombined and processed by further layers of the neural network. A particularly efficient processing of the input data by the rating system is thus implemented, wherein an efficient and precise calculation of the state rating for a state data point is made possible.

Advantageous embodiments of the present disclosure can rate or assess the state of a three-dimensional test object, such as a mechanical system, on the basis of spatial state data, in particular on the basis of spatial tensor fields. Advantageous embodiments of the disclosure can, in this case, be implemented and categorized according to the type and origin of the underlying state data:

Spatial state data based on physical measurement data of a three-dimensional test object: Spatial state data of mechanical component parts and/or technical systems can be acquired as test objects by means of various measuring methods, e.g., by means of ultrasound, depth image cameras, multi-camera systems, and/or sensor arrays. For example, temperature and/or deformation fields are conceivable here as the basis for spatial state data.

Spatial state data based on numerical simulation data of a test object: By numerical simulation methods, physical states of a test object can be simulated and made available at high resolution. With this approach, a wide variety of states can be examined. For example, stress fields, displacement fields, and/or pressure fields are inter alia conceivable here as the basis for spatial state data.

Spatial state data based on digitization of a three-dimensional test object: In the digitization of a test object (e.g., a mechanical component part or system) and/or in the case of physical measurement data in regard to the test object, errors may possibly occur. The assessment of the digitization state is therefore essential in order to estimate these errors. For example, the local resolution and/or a quality feature of the numerical grid are conceivable here as the basis for spatial state data.

Advantageous embodiments of the present disclosure can have at least one of the following advantages:

Improvement in performance: In particular during a product development, the assessment or rating of physical states of test objects, such as mechanical systems, primarily serves to increase the performance ability of the test object. In this case, for example, the weight reduction, the reduction of noise emissions, the increase in energy efficiency, the reduction of the air resistance, and/or the increase in stability during accidents can be taken into consideration and improved.

Improvement in service life: During product development, the expected service life can be estimated above all with simulation studies, e.g., for force or heat distribution. Measurement results can additionally be used for this purpose during the use of a test object or of a mechanical system.

Increase in reliability: An analysis of the test object or of the technical system, e.g., by means of ultrasound cameras or depth cameras, enables the generation of spatial state data, e.g., in the form of tensor fields. The automatic assessment and rating of these state data enables the automatic monitoring of the operational reliability of the test object or of the system. An automatic assessment/rating of digitization states of the test object is moreover helpful in monitoring the simulation process during product development.

BRIEF DESCRIPTION OF THE SEVERAL VIEWS OF THE DRAWINGS

There are various options for advantageously designing and developing the teaching of the present disclosure. To this end, reference is made, on the one hand, to the appended claims and, on the other hand, to the subsequent explanation of preferred exemplary embodiments of the disclosure based on the drawings. Generally preferred designs and developments of the teaching are also explained in conjunction with the explanation of the preferred exemplary embodiments of the disclosure with reference to the drawings. The drawings show the following:

DETAILED DESCRIPTION

Figure 1:
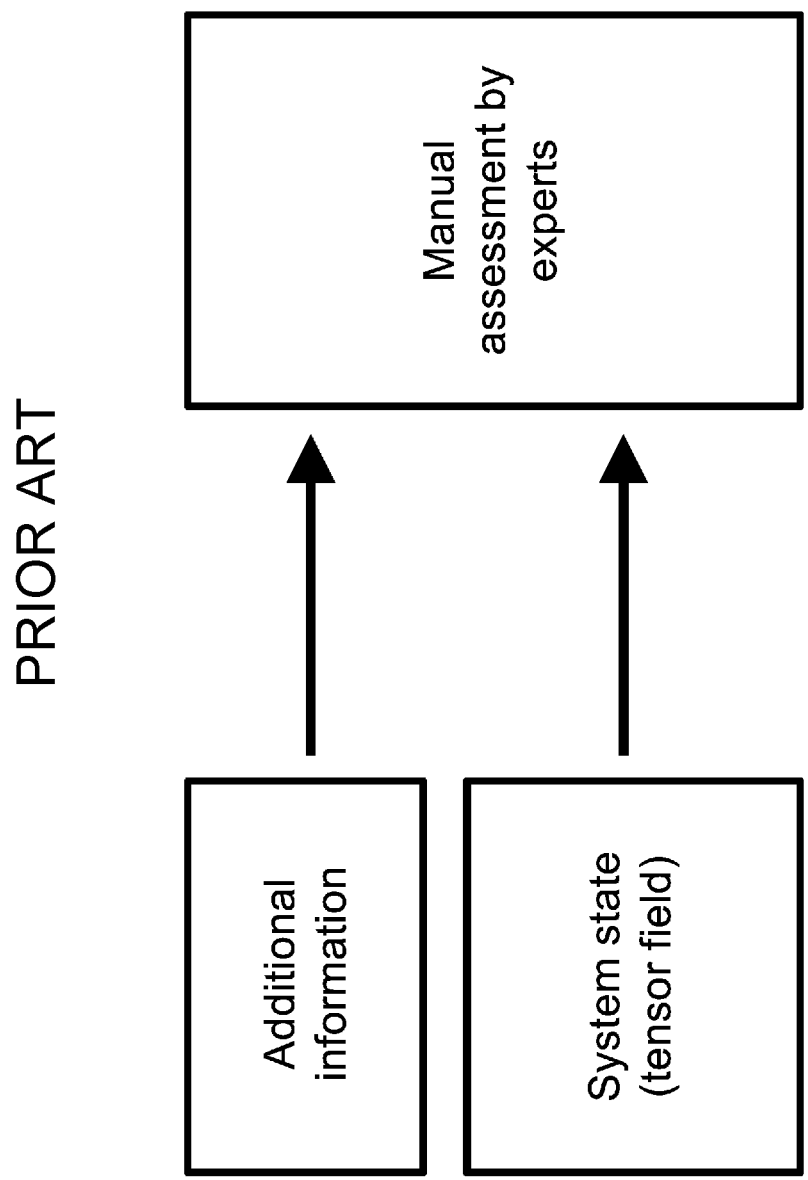
FIG. 1 is a schematic view of an illustration of a manual assessment of a mechanical system by an expert.

FIG. 1 shows a schematic view of an illustration of a manual assessment by a human expert as a typical procedure for rating a mechanical system. The system state is prescribed by a tensor field, which is typically visualized for the expert by a suitable computer-based visualization program. In this case, additional information about the mechanical system to be analyzed is also included so that the expert finally has to assess or rate the system state with the aid of their subjective experience based on the information and data visualized for the expert.

Figure 2:
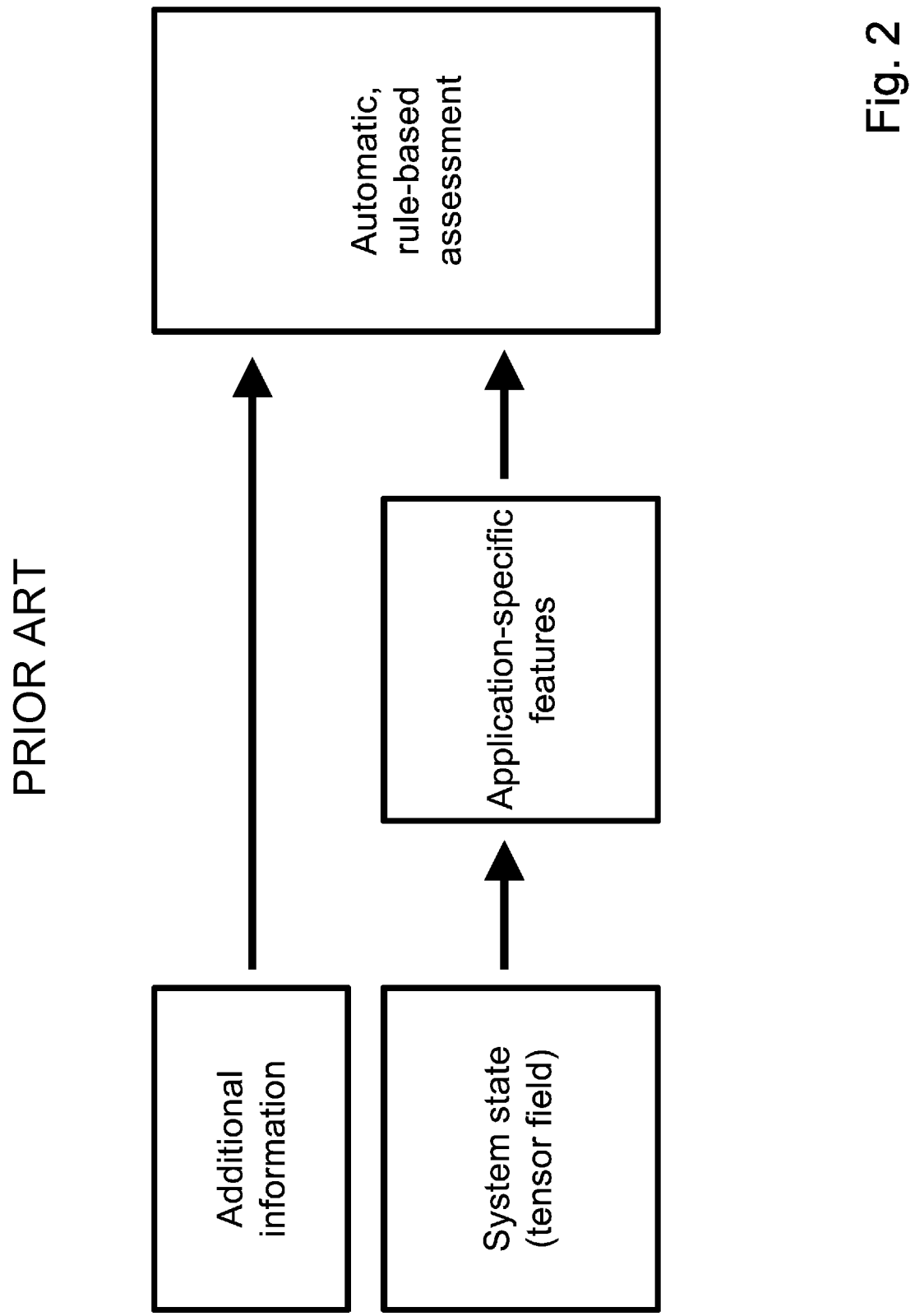
FIG. 2 is a schematic view of an illustration of an automatic assessment of the state of a mechanical system, wherein a rule-based automation becomes possible by defining application-specific features.

FIG. 2 shows a schematic view of an illustration of an automatic assessment of the system state of a mechanical system, wherein, in contrast to the procedure according to FIG. 1, a rule-based automation becomes possible by defining application-specific features.

Figure 3:
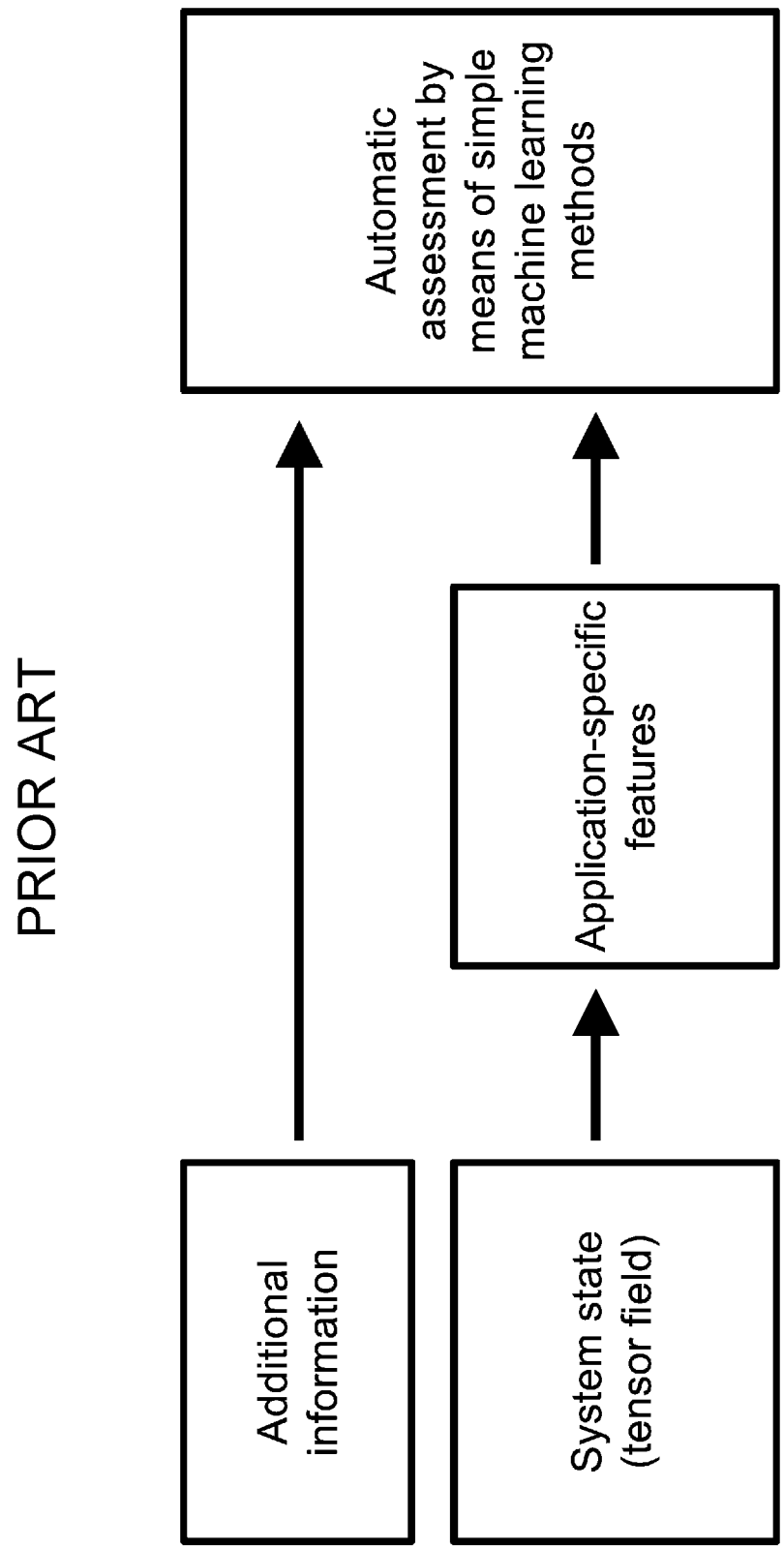
FIG. 3 is a schematic view of an illustration of an automatic assessment of the state of a mechanical system based on simple machine learning methods, wherein the machine learning methods require the definition of application-specific features to assess system states.

FIG. 3 shows a schematic view of an illustration of an automatic assessment of the system state of a mechanical system, wherein, in addition to the procedure according to FIG. 2, simple machine learning methods are used. The machine learning methods require the definition of application-specific features to assess the system state of the mechanical system.

Figure 4:
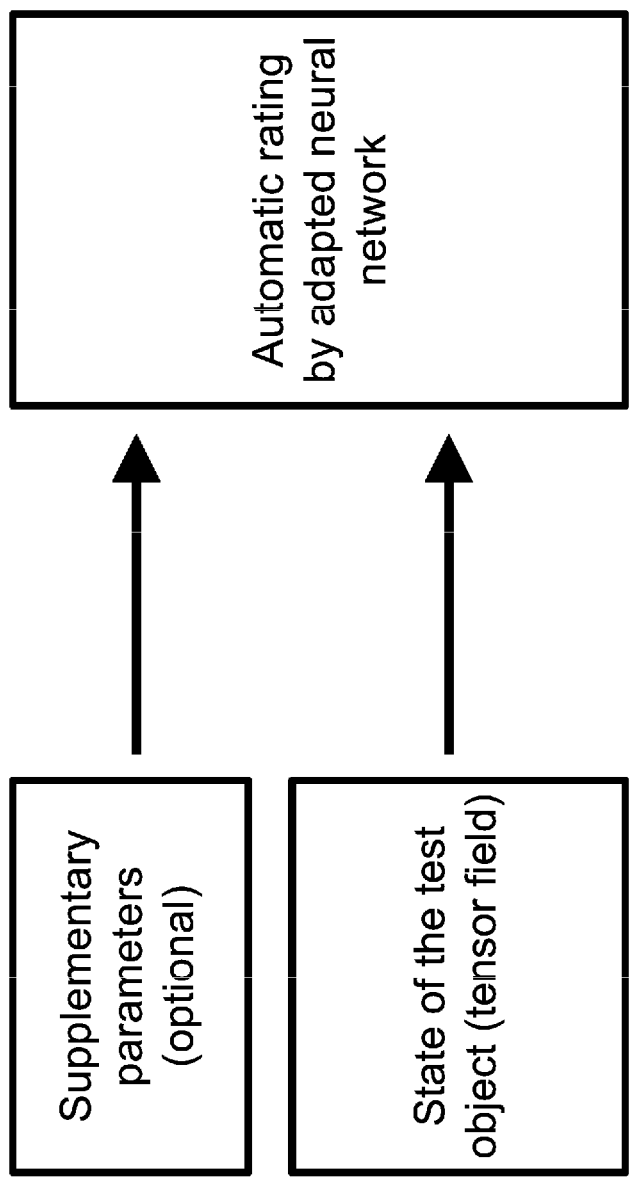
FIG. 4 is a schematic view of an illustration of a method for rating a state of a three-dimensional test object according to an exemplary embodiment of the disclosure, wherein an automatic assessment of the state of the test object takes place.

FIG. 4 shows a schematic view of an illustration of a method for rating a state of a three-dimensional test object according to an exemplary embodiment of the present disclosure, wherein an automatic assessment of the state of the test object takes place. The exemplary embodiment illustrated in FIG. 4 is a method on the basis of a deep neural network that can be used for automatically assessing states of technical systems and/or component parts. System states of the test object can be automatically assessed. The state to be assessed of the three-dimensional test object to be examined is prescribed by spatial state data in the form of a tensor field. Furthermore, one or more supplementary parameters can be provided as additional information. The tensor field and the possibly provided supplementary parameters are analyzed by the trained or adapted deep neural network so that an automatic assessment of the state of the test object takes place.

In this case, the method according to the exemplary embodiment shown in FIG. 4 may comprise the following:

Provision phase: Generating or compiling an application-specific training data record;

Training process: Training the neural network to determine the application-specific network parameters (weightings of the neural network); and Execution process: Automatically recognizing and assigning the previously learned states (estimation) by calculating the state rating for a prescribed state data point.

In a first phase, an application-specific training data record with multiple state data points is created. Each state data point (sample, training example) of the training data record comprises spatial state data representing a training example. Each state data point can furthermore comprise one or more supplementary parameters. The training data record lastly comprises a known state rating for each of the state data points.

Within the framework of a training example, the spatial state data provide the basis for describing or for defining a state of a three-dimensional training object. The supplementary parameters are optional additional information which can likewise influence the state of the training object. Optionally together with one or more state parameters, the spatial state data may thus form the basis for the state of the respective state data point. The known state rating thus results as a function of the spatial state data and, if present, as a function of the optional supplementary parameters. This known state rating of the training examples or of the training data record can be determined manually by skilled human experts. Ideally, training examples including such manual (known) state ratings are already available for a problem or for an application case since corresponding ratings already took place manually in the past.

Figure 5:
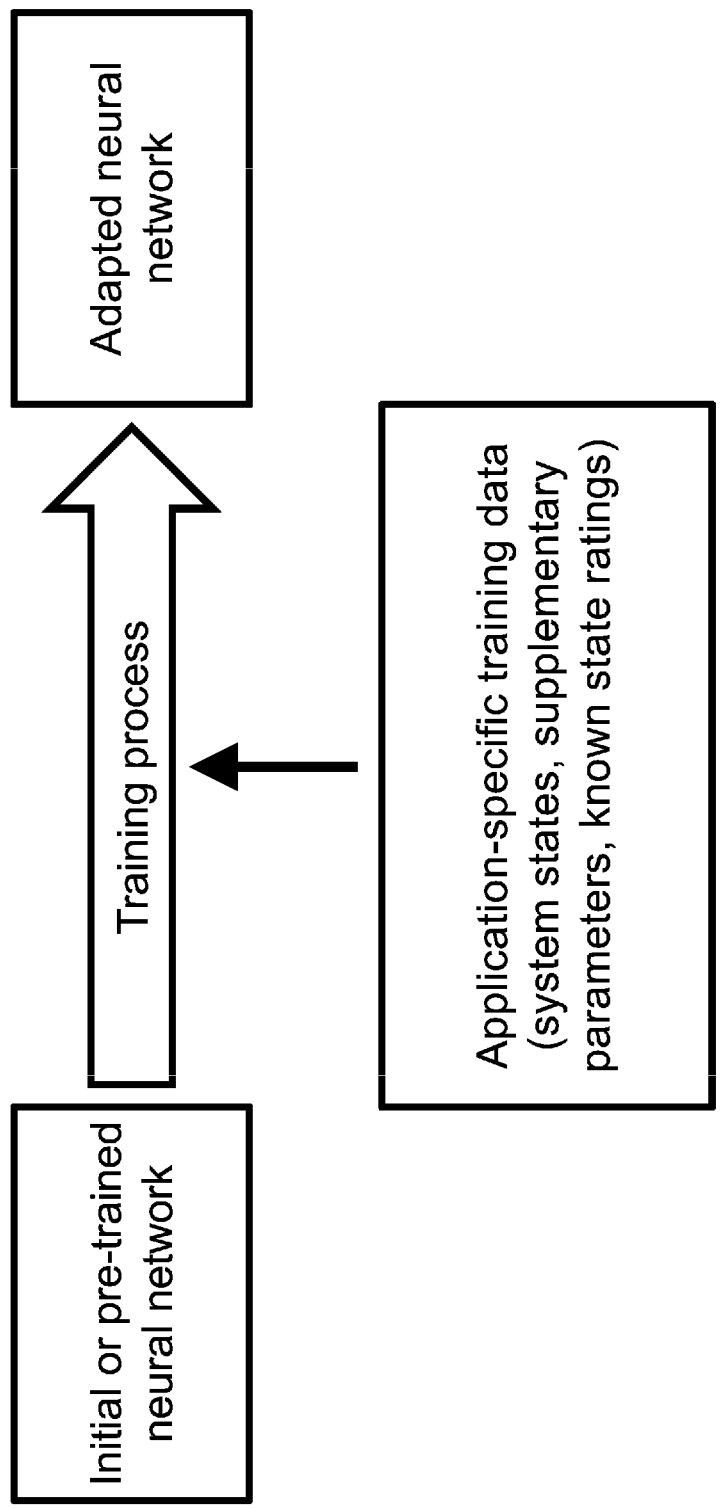
FIG. 5 is a schematic view of an illustration of a training process according to an exemplary embodiment of the disclosure, wherein the neural network is adapted by training to a prescribed assessment task or to a specific application.

FIG. 5 shows a schematic view of an illustration of a training process according to an exemplary embodiment of the present disclosure, wherein the neural network is adapted by training to a prescribed assessment task or to a specific application with respect to a three-dimensional test object. After the training process, the neural network can fully automatically rate or assess system states of the test object.

In the training phase, the network parameters, i.e., the weightings, of a neural network are first adapted on the basis of a training data record comprising application-specific training data. The neural network is thus adapted to or parameterized for a specific application by the training by taking into consideration a prescribed assessment task.

If needed, the training process can be carried out successively with various training data, based on the trained weightings of a preceding training process, so that retraining can thereby be realized.

Once the neural network has been adapted to or trained for the prescribed assessment task, it can recognize and rate in an execution process the state of a test object on the basis of prescribed or provided input data—spatial state data, optionally with one or more supplementary parameters—and on the basis of states previously learned in the training phase. The result of this state rating can be, for example, a numerical value (regression) or the assignment to a predefined class (classification).

Figure 6:
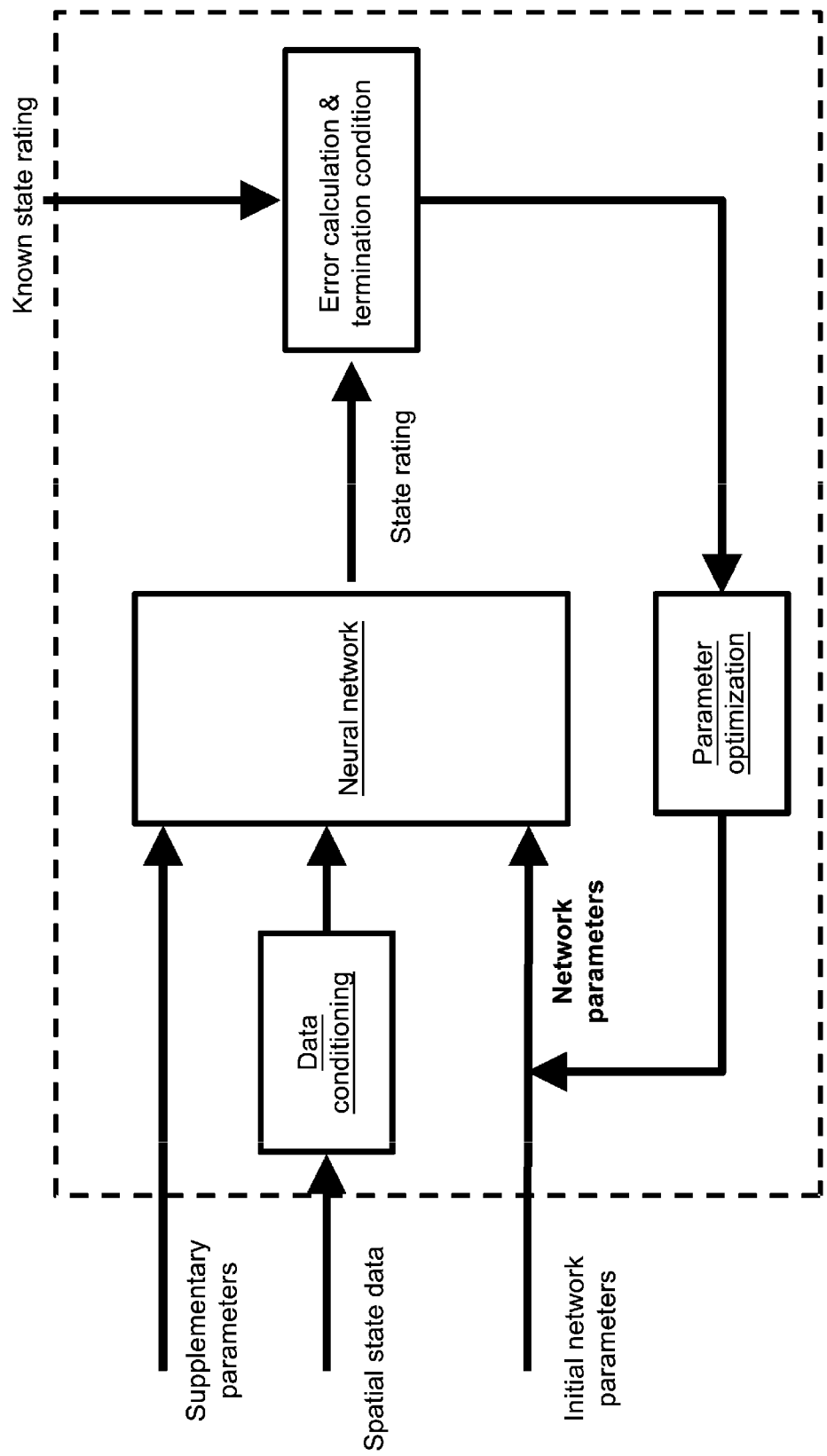
FIG. 6 is a schematic view of an illustration of a training process for adapting a neural network of a rating system according to an exemplary embodiment of the disclosure.

FIG. 6 shows a schematic view of an illustration of a training process for adapting a neural network of a rating system according to an exemplary embodiment of the present disclosure.

The rating system comprises a component for converting the spatial state data, belonging to the input data, into a data format on the basis of regular grids, which data format can be efficiently and easily processed with neural networks.

As a further component, the rating system comprises a modular network architecture on the basis of a convolutional neural network (ConvNet) which allows an efficient state assessment while optionally allowing the processing of one or more supplementary parameters as additional information. Furthermore, the modular network architecture of the rating system enables retraining of the neural network. Regarding further details on convolutional neural networks or on the functional principle of deep neural networks, reference is made to the non-patent literature "LeCun, Y., Bengio, Y., & Hinton, G. (2015): *Deep learning. Nature,* 521(7553), 436."

The rating system of the embodiment illustrated in FIG. 6 is designed in such a way that a training process and an execution process can be performed so that the rating of the state of the test object is possible by using the neural network architecture of the rating system. In the execution process, the state rating for a state data point of the test object is calculated by the rating system trained for the prescribed assessment task.

FIG. 6 schematically shows the structure of the training process. Training examples provided in the form of the training data record serve as input. Depending on the application, a plurality of training examples may typically be required for this purpose. These may be, for example, several hundred thousand training examples. The following inputs are used for each training example within the framework of the training process:

Spatial state data;
One or more supplementary parameters (optional);
Initial network parameters for the neural network; and
Known state rating for the training example.

The output or the result of the training process is the updated application-specific network parameters so that the neural network or the rating system is adapted to any test object by taking into consideration the prescribed assessment task.

Within the framework of data conditioning, the spatial state data are converted into a form which is easy and effective to process for neural networks. For example, the conversion of the spatial state data into a tensor field on a Cartesian grid is appropriate for this purpose. Prior to the first training, i.e., before the training process, the network parameters (weightings) of the neural network can be initialized on the basis of an initialization function.

The calculations or "estimates" of the neural network are then compared to given expert assessments, namely the known state ratings, and an error calculation takes place. A parameter optimization is subsequently performed. This parameter optimization step may be suitably performed repeatedly until a termination condition is satisfied. Conceivable as a termination condition is, for example, the undershooting of a prescribed error limit or the reaching of a prescribed, optionally maximum, number of optimization steps.

Within the framework of data conditioning, the spatial state data are conditioned in such a way that they are represented in the form of a regular, preferably Cartesian, grid. The spatial state data can thus be effectively analyzed by means of deep neural networks.

This representation form can be interpreted as a tensor of stage N+3, where N is the order of the tensor field of the input data (for a scalar field, such as a temperature field, for example, N=1 then applies; for a stress field, N=2 applies; if the data are additionally temporally resolved, the dimension increases by 1). In an advantageous application, the input data, e.g., measurement data or simulation data, must first be converted into this representation.

Spatial state data obtained from measurement results are usually represented on the basis of point clouds. In order to convert such a tensor field into a regular grid, the sampling points located in a grid cell can be combined by averaging the respectively assigned tensors, for example. Further possibilities known to the person skilled in the art from practice are likewise conceivable.

Spatial state data obtained from numerical simulations are usually represented by tensor fields on the basis of unstructured polygonal networks. In order to convert such a tensor field into a regular grid, the polygonal network can be sampled, for example, at the center points of the grid cells of the regular grid. Further possibilities known to the person skilled in the art from practice are likewise conceivable.

Particularly in the case of large mechanical systems as the test object, the representation of spatial state data in the form of regular grids requires a great deal of memory space. Measures can therefore advantageously be taken in order to reduce memory usage. For this purpose, it may be advisable to separately examine only a small part of the test object in each case, e.g., by dividing the grid into various regions. Furthermore, it is conceivable to use adaptive data structures for storing the spatial state data on the regular grid. Various data structures known from the practice of computer graphics are conceivable for this purpose, such as the use of octrees. An octree is a rooted tree whose nodes respectively have either eight direct or no children. Three-dimensional data records can thus be suitably subdivided hierarchically.

Figure 7:
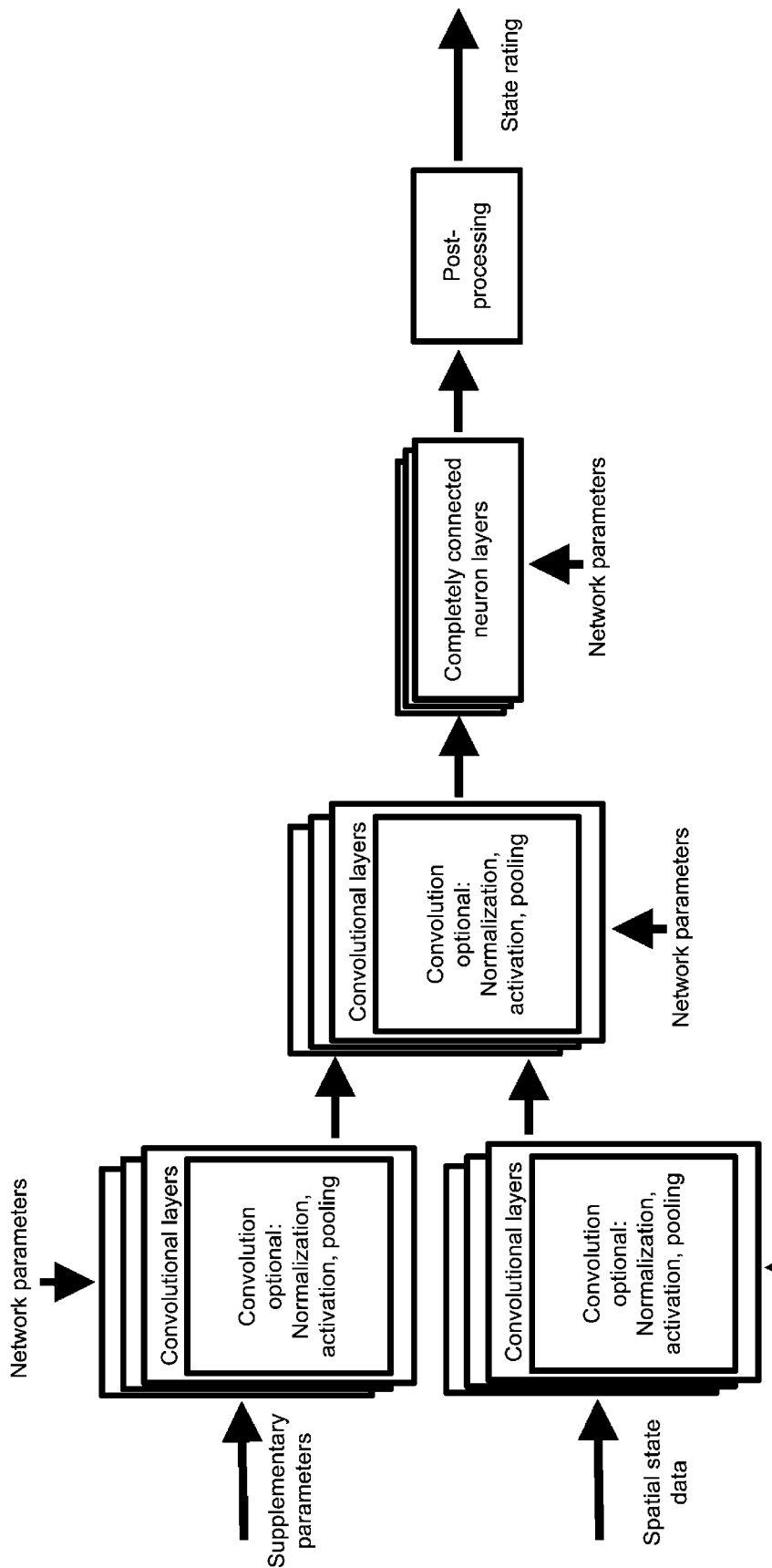
FIG. 7 is a schematic view of a network architecture of a deep neural network for a rating system according to an exemplary embodiment of the disclosure, wherein the deep neural network is designed as a convolutional neural network.

FIG. 7 shows a schematic view of a network architecture of a deep neural network for a rating system according to an exemplary embodiment of the present disclosure, wherein the deep neural network is designed as a convolutional neural network.

The spatial state data of the test object on the one hand and, on the other hand, one or more supplementary parameters of the test object, such as weight, frequency information, material types, etc., are used as input data for the deep neural network. The spatial state data are present as a tensor field on a Cartesian grid.

Various architectures suitable for the assessment of input data are conceivable for the implementation of deep neural networks. FIG. 7 shows one possible embodiment of a rating system on the basis of a convolutional neural network (ConvNet). In this case, the supplementary parameters and the spatial state data are first processed separately from one another in multiple convolutional layers, each optionally with a subsequent normalization, activation, and pooling layer, before the results are combined and processed by further layers. The spatial state data are already present here in conditioned form, namely as a tensor field on a Cartesian grid. Furthermore, the exact number of convolutional layers and the specific configuration (normalization, activation, and pooling layer) can vary in accordance with the application.

After the convolutional layers of the neural network shown in FIG. 7, one or more completely connected neuron layers can follow in order to define the output of the neural network to a specific dimensionality, as frequently desired, for example, in the case of classification. In diverse applications, post-processing may lastly take place by special activation/normalization functions (e.g., voting). The sum of all network parameters (weightings) for each layer determines the behavior of the neural network. These network parameters can be determined in a training process, which is indicated by way of example with the embodiment shown in FIG. 6.

In the embodiment of FIG. 7, a convolutional layer is implemented as a combination of convolution step, activation step, normalization step, and pooling step. These steps can be performed within the neural network several times in succession in different configuration and sequence. Furthermore, multiple convolutions may be performed, including normalization and activation, in order to subsequently perform a pooling step.

The name "convolutional layers" originates from the same-named mathematical operation "convolution" on which the convolutional layer is based. A convolution (f*g) of two functions f and g with $\mathbb{R}^n \to \mathbb{C}$ results as follows:

$$(f*g)(x) := \int_{\mathbb{R}^n} f(\tau) g(x-\tau) d\tau$$

In applications of convolutional networks as a neural network, multidimensional discrete data are usually used. Accordingly, discrete convolution can be used. In the convolutional layer, an input I, e.g., a temperature field on a three-dimensional grid, is then convoluted with a convolutional kernel K in order to thus generate the output or the result of the convolution. The parameters optimized during training correspond to the parameters of the convolutional kernel K. For three-dimensional input data, discrete convolution thus results by a formula as follows:

$$S(i, j, k) = (I*K)(i, j, k) = \sum_m \sum_n \sum_p I(i-m, j-n, k-p) K(m, n, p)$$

S(i, j, k) here denotes the result of the convolution of the input data I at the location i, j, k with a convolutional kernel K of size m, n, p.

In order to speed up the training and/or perform it more robustly, the inputs or outputs of various layers within the neural network can be normalized. Faster and more robust training can thus be made possible. This can be done in the normalization step on the basis of the expected value and the variance of the training data.

Activation layers can be used to generate a non-linear output from the linear output of a convolution. The sigmoid function is suitable here, for example:

$$y = \frac{1}{1+e^{-x}}$$

Furthermore, only partially differentiable functions, such as Rectified Linear Unit 3 (ReLU3) and its configurations, such as LeakyReLU, or random functions, such as dropout-layer (setting randomly selected values of the output to 0) may also be used.

The following applies to the ReLU activation function:

$$y = \max(0, x)$$

The following applies to the LeakyReLU activation function:

$$y = \begin{cases} x & \text{if } x > 0 \\ \alpha * x & \text{otherwise} \end{cases}$$

Pooling layers are used to combine the output of previous operations. In this case, a combination is generated over a defined neighborhood according to a specific procedure. As a strategy for pooling, max pooling can be used, in which a rectangular neighborhood is combined by choosing its maximum value.

The network parameters of the deep neural network of the embodiment shown in FIG. 7 can be determined with a backpropagation method. Various optimization methods known from practice are conceivable. For example, the stochastic gradient descent or a modified version, such as the Adam method, may be applied. In this case, the entire data record is advantageously not used for an optimization, but repeatedly randomly selected subsets of the training data record are used to calculate the gradient. The necessary adaptation of the parameters is determined with the aid of this gradient, which is calculated based on a target function. An error function which quantifies the deviation between the prediction of the neural network and the expert opinion, namely the known state rating, can serve as the target function in machine learning.

Depending on the desired function and error margin of the estimator, different methods can be used to calculate the error of a prediction. In the case of a classification, the error can be determined, for example, as the mean square error between input and output or with the aid of cross entropy.

The cross entropy between the annotation y' and the prediction y is calculated as follows:

$$H_{y'}(y) := -\sum_i y'_i \log(y_i)$$

With respect to an initialization of the network parameters (weightings) of the neural network, these can be initialized with random values before the first training. This can be suitably done, for example, with the Xavier initialization function, in which the weightings are randomly selected from the interval defined as follows:

$$\left[ -\frac{\sqrt{6}}{\sqrt{\text{in}+\text{out}}}, \frac{\sqrt{6}}{\sqrt{\text{in}+\text{out}}} \right]$$

With this interval, a random sampling can take place within the framework of the Xavier initialization, wherein in corresponds to the number of input neurons and out corresponds to the number of output neurons. In this case, however, a great deal of training data is necessary before the neural network achieves good assessment accuracy.

So-called transfer learning provides a further possibility: In this case, the neural network is first trained for a related task for which many training data are available. In further training steps, the neural network is then adapted to the specific target application (retraining). Various embodiments are conceivable for this procedure. One possibility may be that the parameters of the completely connected neuron layers are again randomly initialized before retraining, but the other parameters are taken over from the previous training. In this case, it may be useful to keep the network parameters (weightings) of the convolutional layers constant.

Figure 8:
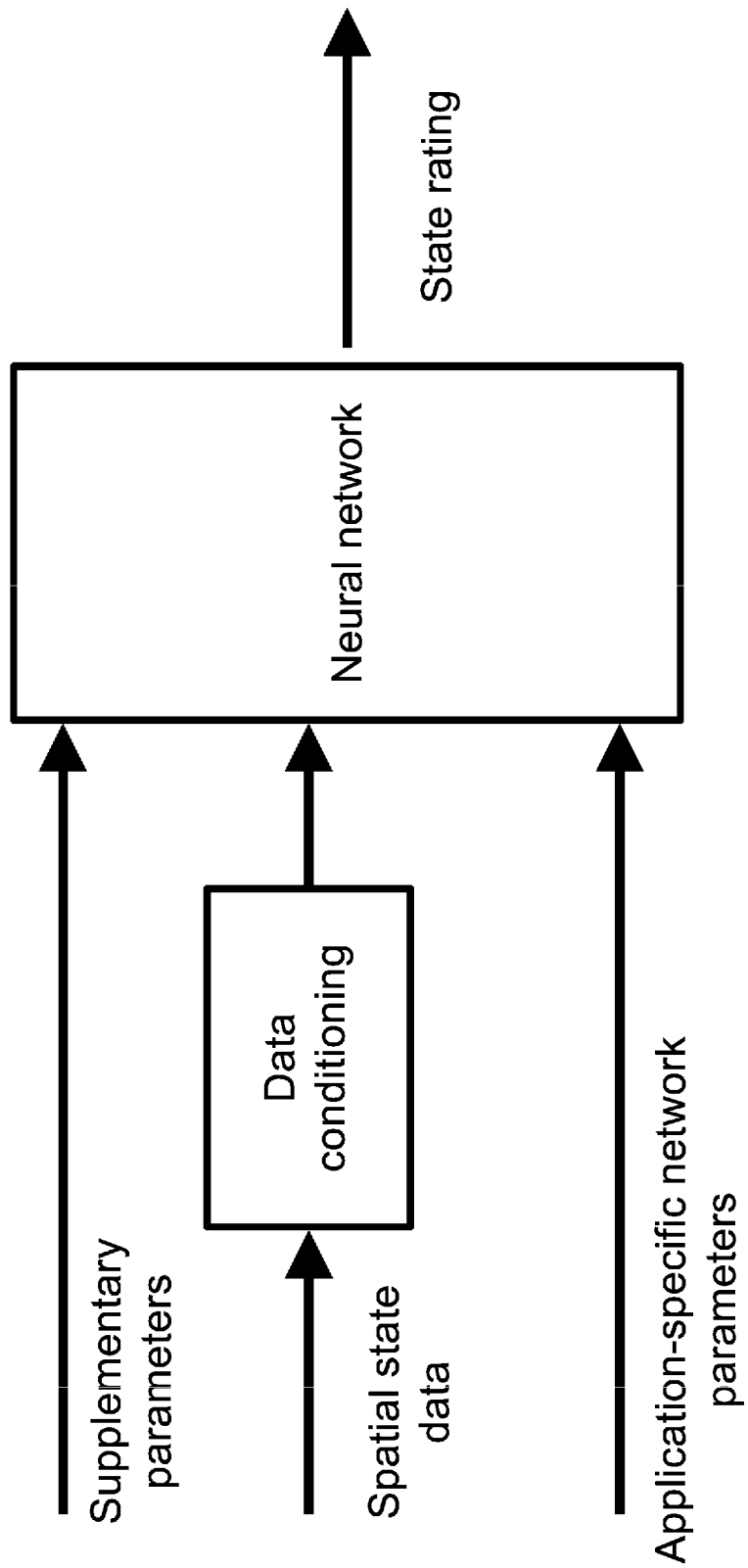
FIG. 8 is a schematic view of an illustration of a method for rating a state of a three-dimensional test object according to an exemplary embodiment of the disclosure, wherein an automatic assessment of the state of the test object takes place.

FIG. 8 shows a schematic view of an illustration of a method for rating a state of a three-dimensional test object in accordance with an exemplary embodiment of the disclosure, wherein an automatic assessment of the state of the test object takes place. After the determination of the application-specific network parameters within the framework of the training is completed, the rating system can be used within the framework of the execution process to automatically rate or assess the state of the test object.

Figure 9:
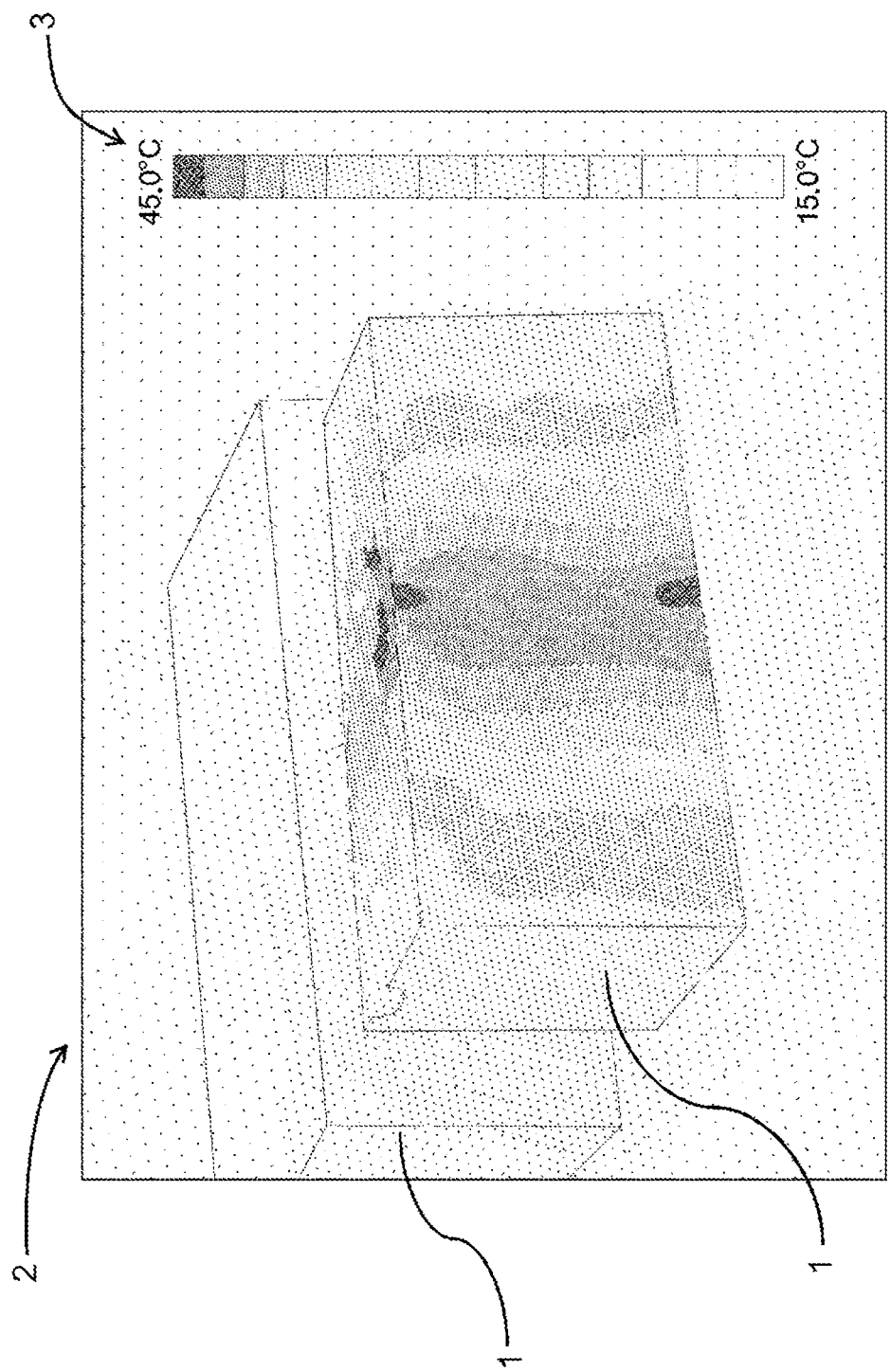
FIG. 9 is a schematic view of an illustration of a temperature field as spatial state data of an accumulator pack for a method according to an exemplary embodiment of the disclosure.

FIG. 9 shows a schematic view of an outlined illustration of a temperature field of an accumulator pack 1 for a method according to an exemplary embodiment of the disclosure. FIG. 9 is intended to illustrate the result of a thermal 3D imaging process, wherein the accumulator pack 1 was photographed from various directions with a depth camera and a thermal imaging camera during a charging operation and a three-dimensional point cloud 2 was subsequently generated by image fusion. FIG. 9 shows temperatures in the range between 15° C. and 45° C. according to the temperature scale 3 on the accumulator pack 1. Here, a temperature is present for each point on the visible surface of the accumulator pack 1. A spatial state field of the temperature on the surface of the accumulator pack 1 can thus be created from various 2D thermal images and depth information in order to then be supplied as spatial state data to a rating system according to an embodiment of the disclosure. The rating system can rate the state of the accumulator pack 1 based on the discretized temperature field.

Defects in the accumulator pack 1 can not only reduce the power of a system driven by the accumulator pack 1 but can also constitute a dangerous source of explosion.

Up to now, such data were analyzed or rated by human experts. By using a rating system or by performing a method according to an embodiment of the present disclosure, it is now possible to predict or calculate the error probability and also the type of possible error sources in an automated manner.

For this purpose, several hundred state data points of training objects are first collected and provided within the framework of a training data record. Within the framework of the exemplary embodiment relating to the accumulator pack 1, each state data point of the training data record comprises the following:

Spatial state data: Point cloud with temperature information per sampling point in the sampling space, obtained from sensor data, and Supplementary parameters: Age of the pack, current charging current.

The training data record furthermore comprises a known state rating for each of the state data points. The known state rating is determined in advance by a skilled expert, wherein the following assessments or state ratings are distinguished:

Accumulator pack fault-free;
Accumulator pack with faults, no safety risk; and
Accumulator pack with faults, safety risk.

In order to convert the temperature field defined on a point cloud into a regular grid, the resolution of the grid is first defined (e.g., 256×256×256 cells). Depending on the size of the accumulator pack, the size of the grid cells is then calculated by dividing the dimensions by the number of cells in each spatial direction. For each cell, all points P_i located in the cell are then searched. The temperature value for each grid cell then lastly results from averaging the temperature values at the points P_i.

Good results can be obtained with various neural network configurations. A particularly advantageous configuration of the neural network is as follows:

Convolutional layers for spatial state data: The convolutional layers use normalization and activation by means of LeakyReLU; a max pooling is also performed every two to three layers. A total of six to nine convolutional layers.

Convolutional layers for supplementary parameters: A convolutional layer including normalization and activation by means of LeakyReLU.

Further convolutional layers: Two to three convolutional layers including normalization and activation by means of LeakyReLU.

Two completely connected neuron layers and post-processing by means of softmax normalization lastly follow.

Initially, the network parameters (weightings) of the neural network are initialized by means of Xavier initialization. In the case of existing data, the described strategy of retraining is pursued.

As described, a three-dimensional point cloud with temperature information per sampling point is used as input for the rating system. Furthermore, the age of the accumulator pack 1 and the current charging current serve as input for the rating system. The three-dimensional point cloud with the temperature information per sampling point forms the spatial state data in the form of a discretized temperature field. The age and the current charging current represent the supplementary parameters.

The rating system can then automatically assess the state of the accumulator pack 1 based on the spatial state data, namely the discretized temperature field, and based on the supplementary parameters, while distinguishing the following cases:

Accumulator pack fault-free;
Accumulator pack with faults, no safety risk; and
Accumulator pack with faults, safety risk.

Figure 10:
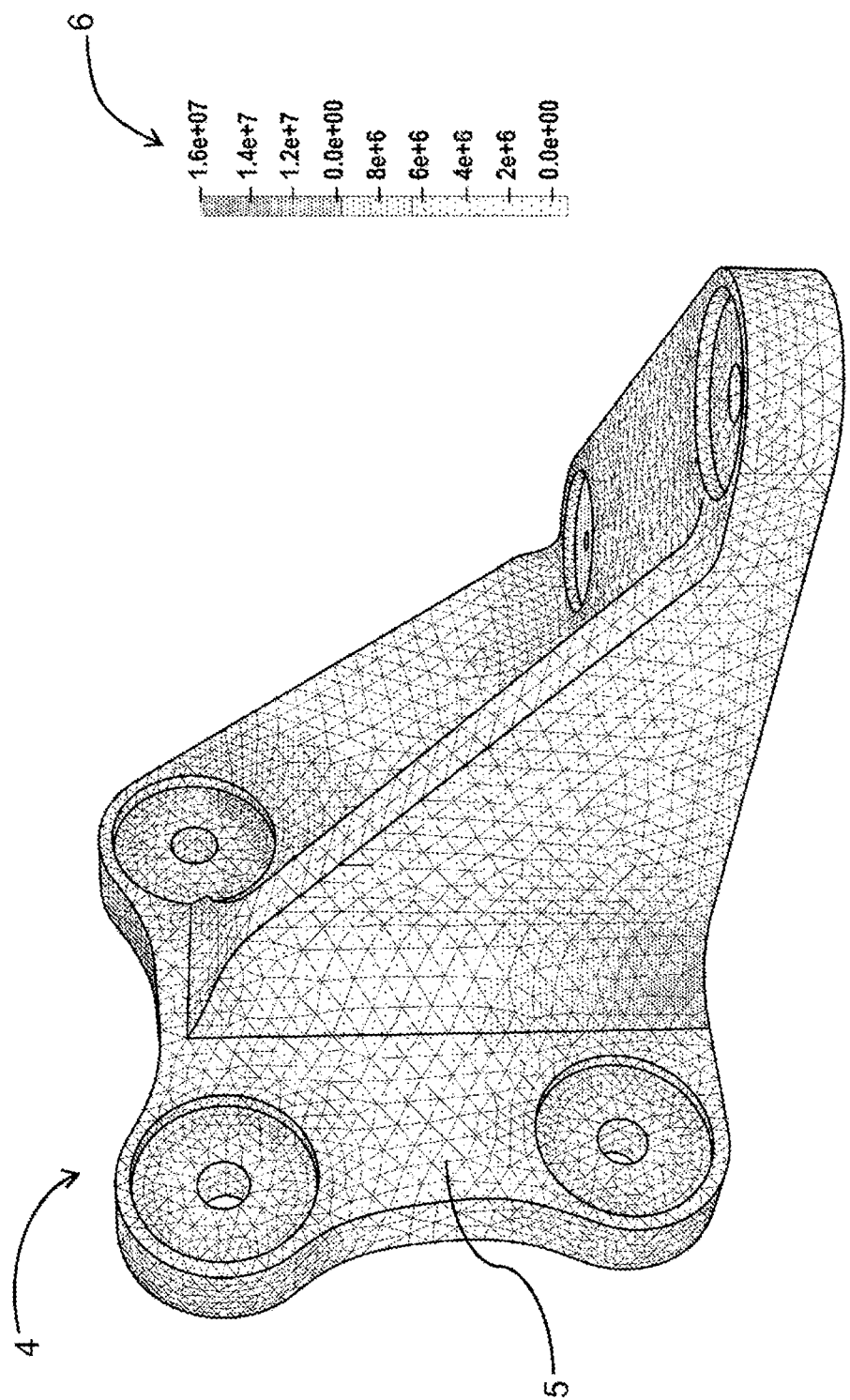
FIG. 10 is a schematic view of an illustration of a stress field, calculated by numerical simulation, of an angle bracket for a method according to an exemplary embodiment of the disclosure, FIG. 11 a schematic view of a representation of the angle bracket according to FIG. 10 but without the polygonal grid and with sampling points shown on the angular geometry, and FIG. 12 a schematic view of an illustration of a method for rating a state of a mechanical system as a three-dimensional test object according to an exemplary embodiment of the disclosure.

FIG. 10 shows a schematic view of an illustration of a stress field, calculated by numerical simulation, of an angle bracket 4 for a method according to an exemplary embodiment of the present disclosure. The stress field of the angle bracket 4 is represented as a scalar field (Von-Mises stress) on a polygonal grid 5 according to the stress scale 6, wherein the polygonal grid 5 in FIG. 10 is designed as a tetrahedron grid.

An angle bracket for a mechanical system is to be built as lightweight as possible without impairing reliability and service life. For this purpose, the stresses (force per area) in the angle bracket are determined with the aid of a numerical simulation. The result is then present as a tensor field on a polygonal grid. For each node in the grid, there is precisely one stress tensor (3×3 matrix). For manual assessment, this stress tensor can be converted into a scalar value (Von-Mises stress) and visualized for the "assessing" engineer as outlined in FIG. 10, for example.

On the basis of this visualization, a human expert currently assesses based on their experience-based knowledge whether the angle bracket is designed to be stable enough. With a method or with a rating system according to an embodiment of the present disclosure, it is possible to automatically classify specific patterns in the stress field of the angle bracket and thus to rate the state of the component part.

In order to create a training data record, several hundred state data points are collected, each state data point comprising the following:

Spatial state data: Discretized stress field on polygonal grid with stress information per sampling point, obtained from numerical simulation, and Supplementary parameters: Type of material used.

The training data record furthermore comprises a known state rating for each of the state data points. The known state rating is determined in advance by a skilled expert, wherein the following assessments or state ratings are distinguished:

Angle bracket correctly simulated, stress field perfect, good design;

Angle bracket correctly simulated, stress field problematic, design must be changed; and Angle bracket erroneously simulated, simulation must be repeated.

Figure 11:
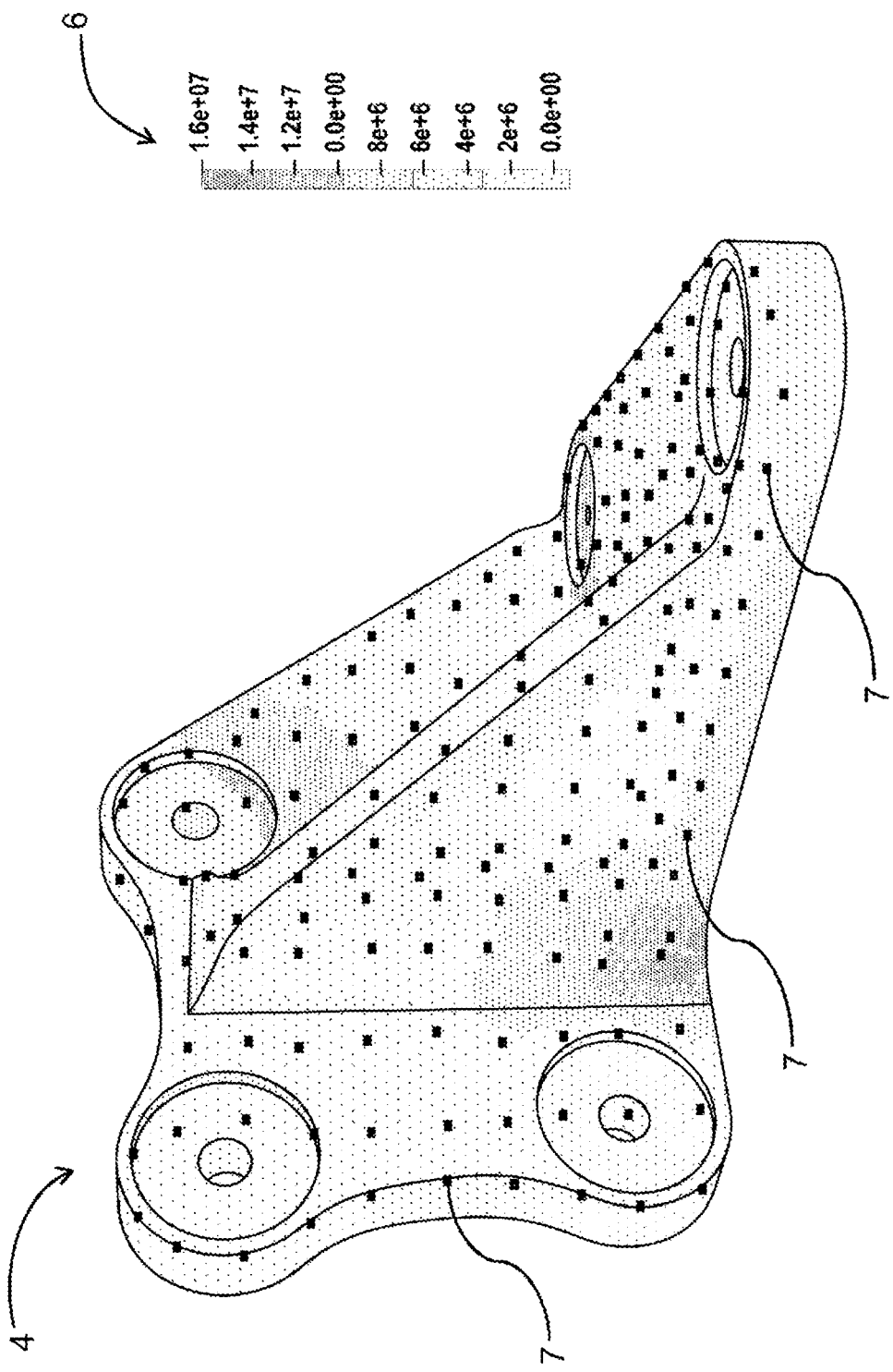

FIG. 11 shows a schematic view of a representation of the angle bracket 4 of FIG. 10 but without the polygonal grid and with sampling points 7 shown on the angular geometry of the angle bracket 4.

In order that the spatial state data of a state data point can be analyzed by the neural network of the rating system, the spatial state data are subjected to data conditioning. To this end, sampling is carried out in order to transfer the stress field defined on the tetrahedron grid shown in FIG. 10 onto a regular grid. First, a regular grid is defined. Then, it is identified for each center point P of a grid cell in which tetrahedron T of the original grid P is located. The stress tensor at P is then calculated by linearly interpolating the stress tensors at the four points in the tetrahedron T. In this respect, FIG. 11 illustrates the position of the sampling points on the geometry of the angle bracket.

A particularly advantageous configuration of the neural network of the rating system can be carried out as in the case of the network configuration in the exemplary embodiment relating to the accumulator pack, wherein, however, no convolutional layers are used for processing supplementary parameters.

Initially, the network parameters (weightings) of the neural network are initialized by means of Xavier initialization. In the case of existing data, the described strategy of retraining is pursued.

As described, a stress field on a polygonal grid, which was calculated by means of numerical simulation, is used as input for the rating system as spatial state data. Furthermore, the type of material used for the angle bracket serves as input for the rating system as additional information.

The rating system can then automatically assess the state of the angle bracket based on the spatial state data, namely the discretized stress field, and based on the supplementary parameter, while distinguishing the following cases:

Angle bracket correctly simulated, stress field perfect, good design;

Angle bracket correctly simulated, stress field problematic, design must be changed; and Angle bracket erroneously simulated, simulation must be repeated.

The stress state of an angle bracket as a test object can thus be automatically assessed.

Figure 12:
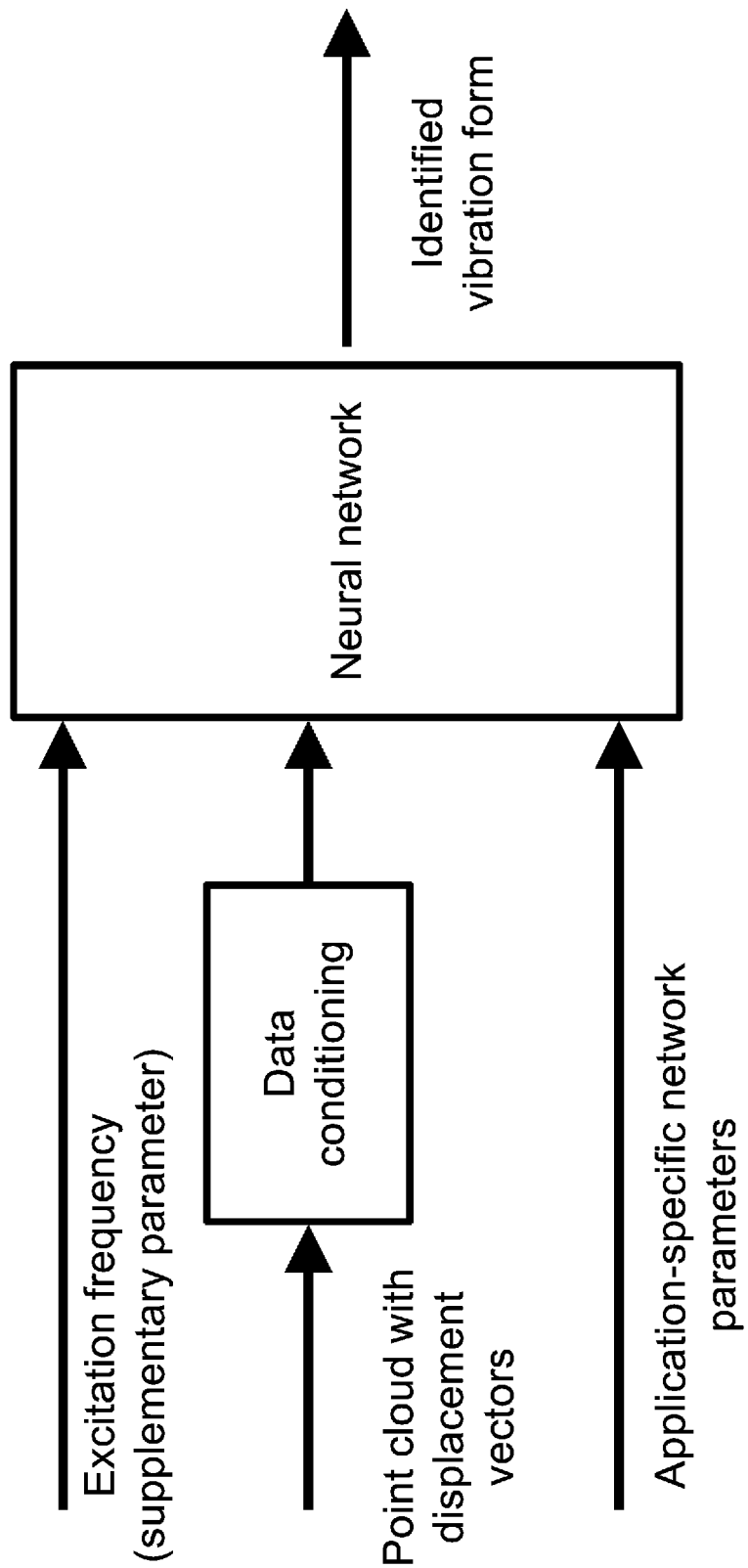

FIG. 12 shows a schematic view of an illustration of a method for rating a state of a mechanical system as a three-dimensional test object according to an exemplary embodiment of the present disclosure. In order to optimize the noise comfort and/or the longevity of mechanical systems, such as a body of an automobile or an aircraft fuselage/wing, the vibration behavior of the system, i.e., of the test object, must be analyzed and optimized. For this purpose, essential vibration forms, such as the torsion, are preferably identified in measurement data and/or simulation data. The three-dimensional test object or the mechanical system can be rated or examined with respect to its vibration behavior with the exemplary embodiment of FIG. 12.

The exemplary embodiment of FIG. 12 is characterized in that a point cloud with assigned displacement vectors is present for a three-dimensional test object, namely a complex mechanical system, such as a motor vehicle body or an aircraft fuselage or an aircraft wing. A three-dimensional displacement field is thus provided as the state data point. This state data point represents a spatial vibration form as the state of the test object. Furthermore, it is conceivable that this state data point together with the assigned excitation frequency, which can optionally be assigned, represents a spatial vibration form as the state of the test object.

The spatial state field of the displacement vectors, i.e., the three-dimensional displacement field, can be obtained by a dense measurement field of sensors or by simulation. The rating system can then rate the state of the system in regard to the vibration behavior based on a discretized displacement field. It is furthermore conceivable that the rating system rates the state of the system in regard to the vibration behavior based on a discretized displacement field and the associated excitation frequency.

The vibration state of the test object or mechanical system in regard to various excitation frequencies is decisive for the noise comfort and the longevity of the mechanical system. The rating of the individual vibration forms, i.e., the assignment of the state data point to physically relevant basic patterns, such as the torsion, is essential for this purpose. It can thus be prevented that these relevant basic vibration forms resonate with known external excitation frequencies and that too much noise develops or the mechanical system to be examined is destroyed.

Up to now, such data were analyzed or rated manually by human experts. By using a rating system or by performing a method according to an embodiment of the present disclosure, it is now possible to automatically identify critical excitation frequencies for essential basic vibration forms.

For this purpose, several hundred state data points of training objects are first collected and provided within the framework of a training data record. In the framework of the exemplary embodiment concerning the vibration behavior of the mechanical system, each state data point of the training data record comprises the following:

Spatial state data: Point cloud with displacement vector per sampling point in the sampling space, preferably obtained from sensor data or simulation data, and Supplementary parameters (optional here): Frequency of the excitation signal.

The training data record furthermore comprises a known state rating for each of the state data points. The known state rating is determined in advance by a skilled human expert, wherein the assessment of the vibration forms or state ratings depends on the exact type of mechanical system in each case. For example, one or more of the following assessments or state ratings can be distinguished or taken into consideration for an automobile body or an aircraft fuselage/wing:

Torsion;

Vertical bending; and/or

Transverse bending.

Further assessments or state ratings are conceivable.

For example, in order to convert a displacement field defined on a point cloud into a regular grid, the procedure may be as follows. First, the resolution of the grid is defined (e.g., 256×256×256 cells). Depending on the size of the mechanical system, the size of the grid cells is then calculated by dividing the dimensions by the number of cells in each spatial direction. For each cell, all points P_i located in the cell are then searched. The three-dimensional displacement vector for each grid cell then lastly results from averaging the displacement vectors at the points P_i.

Good results can be obtained with various neural network configurations. A particularly advantageous configuration of the neural network is as follows:

Convolutional layers for spatial state data: The convolutional layers use normalization and activation by means of LeakyReLU; a max pooling is also performed every two layers. A total of six convolutional layers.

Convolutional layers for supplementary parameters: A convolutional layer including normalization and activation by means of LeakyReLU.

Further convolutional layers: Two convolutional layers including normalization and activation by means of LeakyReLU.

Two completely connected neuron layers and post-processing by means of softmax normalization lastly follow.

Initially, the network parameters (weightings) of the neural network can be initialized by means of Xavier initialization. In the case of existing data, the described strategy of retraining can be pursued.

As described, a three-dimensional point cloud with displacement information per sampling point is used as input for the rating system. Furthermore, the frequency of the excitation can serve as optional input for the rating system. The three-dimensional point cloud with the displacement information per sampling point forms the spatial state data in the form of a discretized displacement field. The excitation frequency represents a possible supplementary parameter.

The rating system can then automatically assess the state of the mechanical system based on the spatial state data, namely the discretized displacement field, and optionally based on the optional supplementary parameter, by identifying a basic physical vibration form in the state data point. In the example of an automobile body or an aircraft fuselage or an aircraft wing, the following cases can be distinguished or taken into consideration:

Torsion and/or

Vertical bending and/or

Transverse bending.

Additional cases are conceivable.

By taking into consideration the exemplary embodiment of FIG. 12, a method can be designed as follows:

The method is used to rate a state of a three-dimensional test object by taking into consideration a prescribed assessment task and by using a rating system comprising a neural network. A training data record comprising multiple state data points from one or more three-dimensional training objects is provided and/or used. The training data record comprises a known state rating in regard to the prescribed assessment task for each of the state data points. In order to adapt the rating system to the prescribed assessment task, the neural network of the rating system is parameterized in a training process by using the training data record. In an execution process, a state rating for a prescribed state data point of the test object is calculated or determined with the adapted rating system.

Within the framework of this embodiment, the test object is a mechanical system, for example a vehicle body, an aircraft fuselage, an aircraft wing, or at least a component thereof. The prescribed assessment task can be to ascertain at which frequency a prescribable (or a specific physically relevant) vibration form occurs. The state rating of the test object can thus be a vibration form (vibration pattern). Within the framework of this embodiment, a state data point is a three-dimensional displacement field.

With regard to other advantageous embodiments of the method according to the present disclosure and of the rating system according to the disclosure, reference is made to the general part of the description and the accompanying claims in order to avoid repetition.

Lastly, it is expressly pointed out that the above-described exemplary embodiments of the method according to the present disclosure and of the rating system according to the disclosure serve only to explain the claimed teaching but do not restrict it to the exemplary embodiments.

Moreover, the various embodiments described above can be combined to provide further embodiments. All of the patents, applications, and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for rating a state of a three-dimensional test object by taking into consideration a prescribed assessment task and by using a rating system comprising a neural network, the method comprising: providing and/or using a training data record comprising multiple state data points from one or more three-dimensional training objects, wherein the training data record includes a known state rating in regard to the prescribed assessment task for each of the state data points, using the training data record to parameterize the neural network of the rating system in a training process to adapt the rating system to the prescribed assessment task, and in an execution process using the adapted rating system, calculating a state rating for a prescribed state data point of the test object, wherein the state data points of the one or more training objects and the state data point of the test object each comprise spatial state data, wherein the spatial state data are converted into the form of a regular grid, and wherein the spatial state data are represented as a tensor of stage N+3, where N is the order of the state data per grid point.

2. The method according to claim 1, wherein the test object comprises a component part, a mechanical system, an electromechanical system, and/or an electrochemical system.

3. The method according to claim 1, further comprising selecting the one or more training objects of the training data record in a problem-specific manner such that the prescribed assessment task is applicable to both to the training objects and to the test object.

4. The method according to claim 1, wherein the spatial state data comprised by a state data point of a training object define a state of the training object, and wherein the spatial state data comprised by the state data point of the test object define a state of the test object.

5. The method according to claim 1, wherein the spatial state data are represented as a discretized scalar field, vector field, and/or tensor field.

6. The method according to claim 1, wherein the spatial state data map a physical variable.

7. The method according to claim 1, wherein the spatial state data comprise a temperature field, a deformation field, a velocity field, a stress field, a pressure field, a displacement field, and/or an electromagnetic field.

8. The method according to claim 1, wherein the spatial state data map a digitization state, wherein the spatial state data comprise a local resolution of a numerical grid and/or a quality feature of a numerical grid.

9. The method according to claim 1, wherein the state data points of the one or more training objects and the state data point of the test object comprise at least one supplementary parameter in addition to spatial state data.

10. The method according to claim 9, further comprising configuring the neural network of the rating system such that the spatial state data and the at least one supplementary parameter are processed separately from one another in multiple convolutional layers before respectively calculated intermediate results are recombined and processed by further layers of the neural network.

11. The method according to claim 1, wherein the training process comprises a parameter optimization step, the parameter optimization step including calculating, by the rating system, a state rating for each state data point of the training data record, wherein the known state rating of the training data record belonging to the respective state data point is compared to the calculated state rating, and wherein network parameters of the neural network are adapted as a function of the comparison.

12. The method according to claim 11, wherein the parameter optimization step is performed multiple times with different training data records.

13. The method according to claim 1, further comprising determining application-specific network parameters of the neural network of the rating system by backpropagation in the training process, wherein the training data record and initial network parameters of the neural network are used as input data for the backpropagation.

14. A computer processing system configured to provide and/or execute a rating system for rating a state of a three-dimensional test object by taking into consideration a prescribed assessment task, wherein the rating system comprises a neural network, the computer processing system including computer processing components configured to: provide and/or use a training data record comprising multiple state data points from one or more three-dimensional training objects, wherein the training data record includes a known state rating in regard to the prescribed assessment task for each of the state data points, parameterize the neural network in a training process by using the training data record to adapt the rating system to the prescribed assessment task, and in an execution process, after adaptation of the rating system to the prescribed assessment task, calculate a state rating for a prescribed state data point of the test object, wherein the state data points of the one or more training objects and the state data point of the test object each comprise spatial state data, wherein the spatial state data are converted into the form of a regular grid, and wherein the spatial state data are represented as a tensor of stage N+3, where N is the order of the state data per grid point.

15. A method for rating a state of a three-dimensional test object by taking into consideration a prescribed assessment task and by using a rating system comprising a neural network, the method comprising: providing and/or using a training data record comprising multiple state data points from one or more three-dimensional training objects, wherein the training data record includes a known state rating in regard to the prescribed assessment task for each of the state data points, using the training data record to parameterize the neural network of the rating system in a training process to adapt the rating system to the prescribed assessment task, and in an execution process using the adapted rating system, calculating a state rating for a prescribed state data point of the test object, wherein the state data points of the one or more training objects and the state data point of the test object each comprise spatial state data, and wherein the spatial state data map a digitization state, wherein the spatial state data comprise a local resolution of a numerical grid and/or a quality feature of a numerical grid.

16. A method for rating a state of a three-dimensional test object by taking into consideration a prescribed assessment task and by using a rating system comprising a neural network, the method comprising: providing and/or using a training data record comprising multiple state data points from one or more three-dimensional training objects, wherein the training data record includes a known state rating in regard to the prescribed assessment task for each of the state data points, using the training data record to parameterize the neural network of the rating system in a training process to adapt the rating system to the prescribed assessment task, and in an execution process using the adapted rating system, calculating a state rating for a prescribed state data point of the test object, wherein the state data points of the one or more training objects and the state data point of the test object each comprise spatial state data, wherein the state data points of the one or more training objects and the state data point of the test object further comprise at least one supplementary parameter in addition to the spatial state data, and wherein the neural network of the rating system is configured such that the spatial state data and the at least one supplementary parameter are processed separately from one another in multiple convolutional layers before respectively calculated intermediate results are recombined and processed by further layers of the neural network.

* * * * *